Aug. 14, 1951  G. R. BENZ ET AL  2,564,295
RELIEVING PRESSURE VESSELS WHEN
SUBJECTED TO HIGH TEMPERATURES
Filed July 30, 1946  2 Sheets-Sheet 1

INVENTORS
George R. Benz
BY Elmer O. Mattocks
Austin, Wilhelm & Carlson
ATTORNEYS

UNITED STATES PATENT OFFICE 2,564,295

RELIEVING PRESSURE VESSELS WHEN SUBJECTED TO HIGH TEMPERATURES

George R. Benz and Elmer O. Mattocks, Bartlesville, Okla., assignors to Phillips Petroleum Company, a corporation of Delaware Application July 30, 1946, Serial No. 687,130

13 Claims. (Cl. 137—68)

The invention relates to safety devices and more particularly to devices for relieving pressure vessels when subjected to high temperature.

In the storing of liquefied petroleum gas such as propane, it is the custom to provide pressure relief valves to prevent building up unsafe pressures. Practice has shown that these relief valves are not adequate when high pressures are caused by fire since the fire often weakens the tank structure with the result that the tank ruptures at a pressure equal to or less than that at which the pressure relief valves are set.

An object of the invention is to provide a temperature responsive safety device capable of use with the normal pressure operated relief valve or separately therefrom.

According to a preferred form of the invention, a plurality of thermocouples are provided whose hot junctions are distributed around the sides of the tank where they are subjected indirectly to heat from the fire. These thermocouples operate galvanometers, which in turn operate suitable relays which operate a solenoid-operated relief valve. Provision may be made for the relief valve to open at a predetermined higher temperature but not to re-close until the temperature falls to a prdetermined lower value. Provision may also be made for preventing automatic reclosing of the relief valve and to place reclosing under manual control. Instead of thermocouples, other temperature responsive elements may be used, as for example, bimetallic thermostats.

The invention also consists in certain new and original features and combinations hereinafter set forth and claimed.

Figure 1:
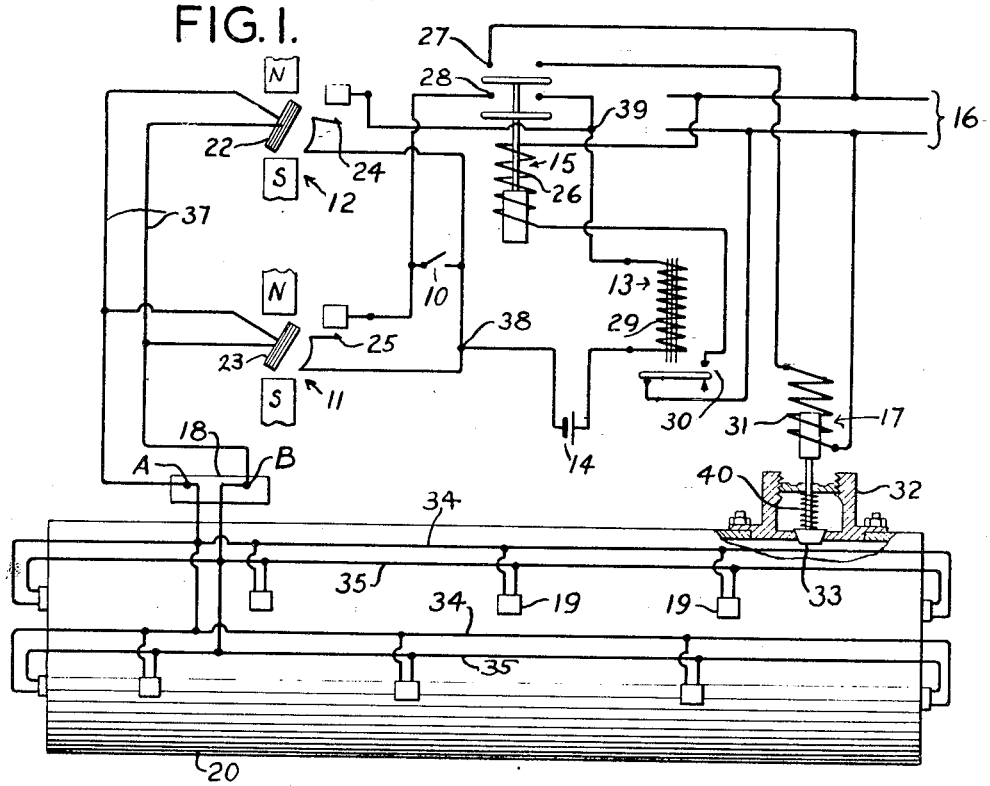
Figure 2:
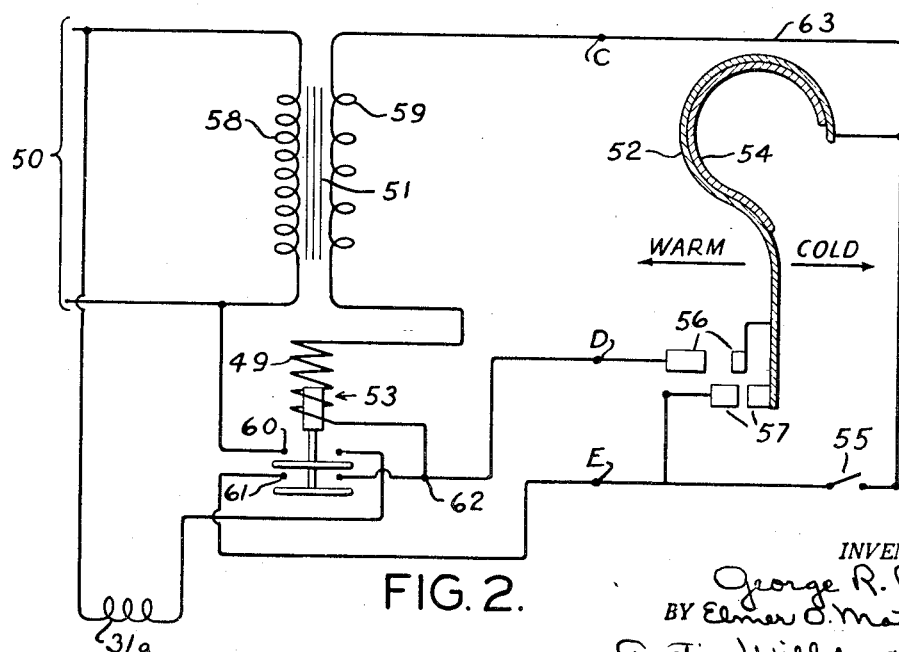
Figure 3:
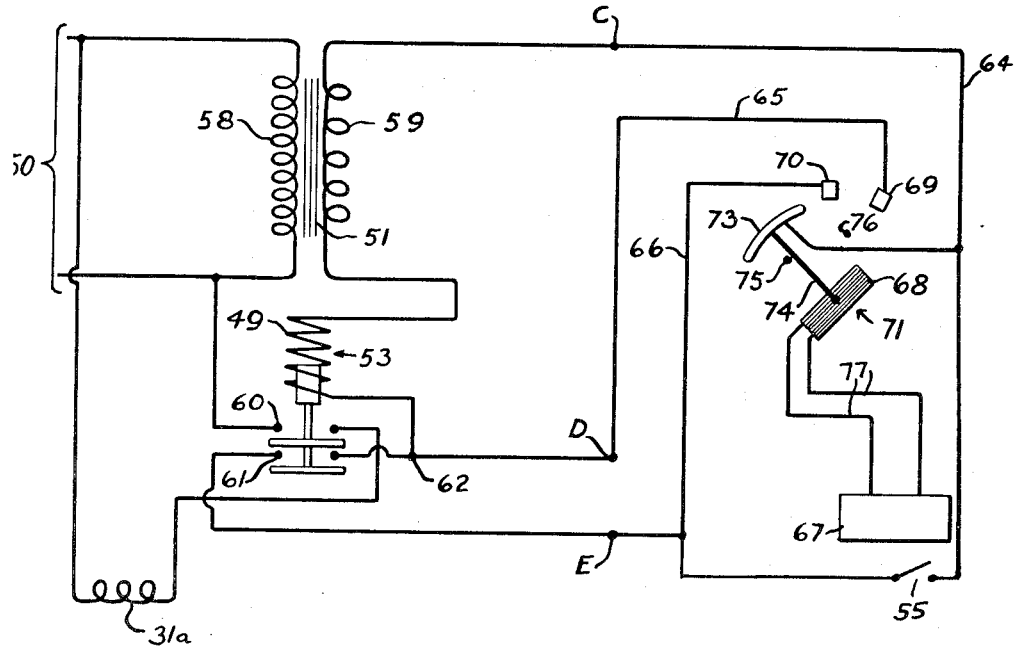

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

Fig. 1 illustrates diagrammatically a circuit arrangement in which a temperature responsive relief valve is controlled by a plurality of thermocouples;

Fig. 2 illustrates diagrammatically a circuit arrangement in which the relief valve is controlled by one or more bimetallic thermostats; and Fig. 3 illustrates diagrammatically a circuit arrangement like that of Fig. 2, but having each bimetallic thermostat replaced by a thermocouple-millivoltmeter combination in which the circuits are closed by means of a sliding contact attached to the pointer of the millivoltmeter.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and more particularly to Fig. 1, the pressure vessel is shown as a horizontally disposed cylindrical steel tank 20 having a temperature-controlled relief valve 17. This relief valve may also be responsive to tank pressure. Surrounding the tank 20 on sides and ends are the hot junctions 19 of the thermocouples. These hot junctions 19 are associated with a cold junction 18 which may be located above the tank 20 in a position unlikely to be affected by accidental fire. The control instruments discussed below will also be located in a spot protected from fire.

It will be understood that the different metals making up the thermocouples extend all the way from the hot junctions 19 to the cold junction 18. One metal may be iron, for example, and is indicated by 34. The other metal may be constantan and is indicated by 35. Thus the wire 34 comprises iron all the way from terminal A to the several hot junctions 19 and the wire 35 comprises constantan all the way from terminal B to the several hot junctions 19. The metal of the wires 37 connecting cold junction 18 with the rest of the circuit may be conventional copper. The iron and constantan wires 34, 35, as well as the other wiring discussed below, may be enclosed in suitable protecting conduits. The hot junctions 19 are shown as connected in parallel. They may also be connected in series. The thermocouple hot junctions and the connecting wires may be placed on the inside of the tank, instead of on the outside.

For responding to the electrical potential created by the fire heating any one or more of the hot junctions 19, two galvanometers 11 and 12 are shown. The "low temperature" galvanometer 11 may respond to a predetermined low temperature difference, say 400° F. between any one hot junction 19 and cold junction 18. The "high temperature" galvanometer 12 may be actuated when the temperature difference between any one hot junction and the cold junction is, say, 600° F. These galvanometers are of similar construction having the usual movable coils 22 and 23 operating between magnets having north and south poles, N and S. Movement of the coils 22 and 23 closes the contacts 24 and 25 as will be understood.

The galvanometers 11, 12 control a solenoid switch 15 of conventional construction comprising a solenoid winding 26, main contacts 27 and holding contacts 28. A locking relay 13 is also provided having a winding 29 and contacts 30. Low voltage battery 14 is also provided. Conventional high voltage power source is denoted by 16, manual switch by 10.

The relief valve 17 includes a solenoid winding 31 operating against spring 40 to raise valve disc 33 seating in the valve casing 32. The valve 33 opens either in response to pressure inside the tank 20 or to current passing through the solenoid winding 31. In either case the gas is vented to a safe point of disposal such as a stack (not shown).

Solenoid 31 may be so designed that a small predetermined tank pressure, say five to ten pounds per square inch, gauge, will open valve 17 while the solenoid 31 is actuated, but valve 17 will be closed by spring 40 should the tank pressure fall below this figure, even though solenoid 31 is still actuated. Thus the tank pressure may be prevented from falling to an unsafe low pressure as a result of venting, and the tank may be prevented from drawing in air upon cooling.

The several parts are wired as indicated. The galvanometer coils 22 and 23 are connected in parallel to the cold junction 18 by wires 37. The battery 14 is connected in circuit with the high temperature galvanometer contacts 24 and with the winding 29 of the locking relay. The battery 14 is also in circuit with the contacts 25 of the low temperature galvanometer, the holding contacts 28, and the winding 29 of the locking relay. It will be noted that the winding 29 is thus under control of two parallel circuits connected at the points 38 and 39.

The source of electricity 16, which may be ordinary commercial A. C. or D. C. power, is connected in series with the solenoid winding 26 of switch 15 and the contacts 30 of the locking relay 13. Power source 16 is also connected in series with the solenoid winding 31 of the relief valve 17 and the main contacts 27 of the solenoid switch 15. Manual switch 10 is connected across low temperature galvanometer contacts 25.

The manual switch 10, when closed, prevents reclosing of the relief valve 17 after opening due to fire except when the relation between solenoid strength and valve spring 40 is such as to cause valve 33 to seat when the small predetermined tank pressure of five to ten pounds per square inch, gauge, is reached, as above explained.

Operation of the circuit will first be explained with the manual switch 10 open.

When fire around gas tank 20 causes the differential temperature between any one hot junction 19 and cold junction 18 to exceed the set 400° F., low temperature galvanometer contacts 25 close but nothing happens because holding contacts 28 of solenoid switch are open. When the said temperature differential reaches the set 600° F., high temperature galvanometer contacts 24 close completing the circuit through battery 14 and winding 29 of the locking relay, closing locking relay contacts 30. This completes the circuit from power source 16 through winding 26 of the solenoid switch operating it to close main contacts 27 and auxiliary contacts 28.

Main contacts 27 close the circuit from power source 16 through the winding 31 of relief valve 17 opening disc 33 and venting the tank gases to stack. Auxiliary contacts 28 lock solenoid switch 15 closed under control of contacts 25 of the low temperature galvanometer.

When the fire is brought under control and the temperature decreases to the 600° F. differential, high temperature galvanometer contacts 24 open, but nothing happens because solenoid switch 15 is held closed by low temperature galvanometer contacts 25. When the temperature differential falls to 400° F., contacts 25 open which releases locking relay 13 whose contacts 30 open and release solenoid switch 15. Opening of solenoid switch contacts 27 opens the circuit through the relief valve winding 31, permitting spring 40 plus gravity to close relief valve 17.

It will be noted that the manual switch 10 is in parallel with the contacts of the low temperature galvanometer 11. Thus, when manual switch 10 is closed, solenoid 31 remains actuated even though both contacts 24 and 25 are open. Relief valve 17 will then remain open until tank pressure has fallen to the predetermined low figure of five to ten pounds per square inch, gauge, when spring 40 will overcome the solenoid and close valve 17. As explained hereinbefore, the closing of valve 17 at such a predetermined low superatmospheric pressure will prevent tank 20 from drawing in air upon further cooling.

The E. M. F. created by a temperature difference between hot junctions 19 and cold junction 18 will depend upon how many of the hot junctions are heated, and how hot each becomes. The hot junctions are assumed to be at the temperature of the adjacent tank wall, to which they are attached.

When the tank is exposed to a fire, the cooling effect of the boiling liquid will tend to keep the tank at a safe temperature even though the internal pressure may be high enough to cause relief valve 17 to open in response to pressure alone. The danger which this invention avoids results when the portion of the tank exposed to the fire is no longer cooled by boiling liquid, as when all or nearly all the liquid has vaporized. Tank pressure may then fall, as a result of venting, to a value below the closing pressure of the relief valve, in which case the latter would close. However, if any portion of the tank is at an unsafe temperature, i. e., if any one of the hot junctions is above the predetermined opening temperature, the solenoid will be actuated and the relief valve opened.

Referring now to Fig. 2, here the source of commercial A. C. or D. C. power is indicated by 50, this source feeding a transformer 51. Current from the secondary 59 of the transformer operates a solenoid switch 53 which is under control of a plurality of bimetallic thermostats, one of which is indicated by 52. The winding 31a corresponds to winding 31 of relief valve 17 in Fig. 1 and is for the purpose of operating a corresponding relief valve. The plurality of thermostats 52 will be located at strategic points around the tank to be protected where they will be affected by fire. A manual switch 55 is also provided.

The thermostat 52 comprises a bimetallic strip 54 so mounted that the end carrying contacts 56, 57 moves in the directions indicated when subject to temperature change. The contacts 56 and 57 have different spacings so that "low temperature" contact 57 may close when a temperature of say 400° F. is reached and "high temperature" contact 56 may close when a temperature of say 600° F. is reached.

The transformer 51 may be a step-down transformer having a primary 58 and a secondary 59. The solenoid switch 53 has solenoid winding 49, main contacts 60 and holding contacts 61.

The apparatus is wired as indicated, the power source 50 being connected to relief valve solenoid 31a through main contacts 60. The solenoid switch winding 49 is under control of a low temperature circuit including low temperature contacts 57, holding contacts 61, winding 53, secondary 59, lead 63 connected to the bimetallic strip 54 to complete the circuit. The solenoid switch winding 49 is also under control of a high temperature circuit which includes high temperature contacts 56, winding 53, secondary 59, lead 63 and bimetallic strip 54. It will thus be noted that the solenoid switch winding 49 is under control of two parallel circuits connected together at the points 62 and thermostat 52. The manual switch 55 bridges low temperature contacts 57, as indicated.

Although for simplicity only one thermostat 52 is shown, there may be a plurality of thermostats distributed around the tank as are the hot junctions 19 in Fig. 1. The additional thermostats 52 will be connected in parallel at the points C, D and E. Thermostats other than bimetallic may also be used.

The operation of this circuit is as follows, assuming, first, that manual switch 55 is open. When a conflagration occurs, one of the thermostats 52 heats up closing low temperature contacts 57 at say 400° F. but nothing will happen since holding contacts 61 are open. When the temperature reaches, say, 600° F., high temperature contacts 56 close completing the circuit through solenoid winding 49 and closing the solenoid switch 53. This closes main contacts 60 which opens the relief valve having winding 31a. The holding contacts 61 also being closed, solenoid switch 53 is now locked closed under control of low temperature contacts 57. Thus, when the fire is extinguished and the temperature is reduced to 600° F., the opening of high temperature contacts 56 will not open the solenoid switch 53; this switch will not open until the temperature falls to 400° F. at which the low temperature contacts 57 are set to open. When contacts 57 open, the solenoid switch 53 releases which in turn closes the relief valve whose winding is 31a.

As in Fig. 1, if desired, the manual switch 55 may be kept closed in which case the solenoid switch 53 will not open when low temperature contacts 57 open but will stay closed, thus preventing the relief valve corresponding to winding 31a from reclosing until switch 55 is manually opened, or until tank pressure has fallen to the predetermined value of five to ten pounds per square inch, gauge.

In Fig. 3 is shown diagrammatically a circuit identical with that of Fig. 2 except that the thermostats 52 are replaced with a plurality of millivoltmeters, one of which is indicated by 71, actuated by thermocouples having their hot junctions, one of which is indicated by 67, disposed at suitable locations on the surface of tank 20. Millivoltmeters 71 may be placed in a safe location as on the top of tank 20, and each may be connected to its respective thermocouple hot junction 67 by thermocouple wires 77. These wires, or suitable extension leads, may terminate in millivoltmeter coil 68 in a conventional manner. Millivoltmeter pointer 74 is provided with a contact 73 at its outer end which is connected to point C by lead 64. Stationary contacts 69 and 70 are connected to points D and E, respectively, by leads 65 and 66. Stops 75 and 76 are provided to prevent excessive travel of pointer 74.

The operation of Fig. 3 is similar to that of Fig. 2. The E. M. F. set up as a result of a conflagration affecting any one of the hot junctions 67 will cause the millivoltmeter pointer 74 to move toward contact 70. Millivoltmeter 71 may be so designed that contact piece 73 touches contact 70 when the temperature of the tank wall (as measured by thermocouple hot junction 67) has reached a predetermined "low" temperature of, say, 400° F. This completes a portion of the circuit across the points C and E, through leads 64 and 66, and contacts 70 and 73, but nothing happens because contacts 61 are open. If the temperature at the hot junction 67 continues to rise until a dangerously high temperature of, say, 600° F. is reached, pointer 74 continues to move to the right until contact is made between movable contact 73 and both stationary contacts 69 and 70. Contact between elements 73 and 69 completes the circuit containing secondary coil 59 of transformer 51, solenoid switch 53, leads 64 and 65. Solenoid switch 53 is thus actuated, closing contacts 60 and 61. Closing of contacts 60 actuates solenoid 31a to open the relief valve. Stop 76 prevents further movement of pointer 74 to the right, regardless of the temperature ultimately reached at the hot junctions 67.

When the fire is brought under control and the temperature at the hot junction 67 falls below 600° F. the contact between 69 and 73 is broken. However, so long as there is contact between 73 and 70, solenoid switch 53 will remain closed and the relief valve open. Upon further cooling to below 400° F. the contact between 70 and 73 is broken and (unless manual switch 55 is closed) solenoid switch 53 is de-energized and opens. This breaks contact at points 60, de-energizes solenoid 31a, and permits spring 40 to close valve 33.

From each of the above forms of the invention it will be seen that the relief valve opens when an unsafe temperature is reached. Thus the relief valve will open at a less pressure when the tank is subjected to the intense heat of fire because the steel walls of the tank weakened by intense heat will rupture at less pressure. Without the protection of this invention a tank with conventional pressure relief valve has been known to rupture under the force of ordinarily safe pressure acting upon heat-weakened steel.

The setting of the reclosing temperature less than the opening temperature provides a margin of safety by insuring the return to safe operating temperature, when the steel has recovered some of its strength, before allowing pressure to build up again in the tank. At the same time reclosing of the relief valve saves any liquid or gas remaining in the tank when the fire is brought under control. However, in the event conditions make it inadvisable to re-close automatically the safety valve after a fire, the manual switch may be kept closed, thus keeping the safety valve open until tank pressure has dropped to a safe figure, say, five to ten pounds per square inch, gauge. Spring 40 will then overcome solenoid 31 to automatically close the valve and prevent the possibility of air being drawn into the tank upon further cooling.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a safety system for storing high pressure fluid, a storage vessel, a relief valve on said vessel, a temperature responsive device adjacent said vessel and subject to conflagration, an electric motor for opening said relief valve, and electric means governed by said temperature responsive device for operating said motor to open said relief valve, said relief valve having means responsive to internal pressure for opening said valve.

2. In a safety system for storing high pressure fluid, a storage vessel, a relief valve on said vessel, a temperature responsive device adjacent said vessel and subject to conflagration, and means governed by said temperature responsive device for opening said relief valve at a predetermined higher temperature and closing said relief valve at a predetermined lower temperature.

3. In a safety system for storing high pressure material, a storage vessel, a solenoid relief valve on said vessel, a temperature responsive device adjacent said vessel and subject to conflagration temperature, a solenoid switch having main contacts and holding contacts, said temperature responsive device having low temperature contacts and high temperature contacts, said solenoid switch being under control by said high temperature contacts and under series control by said low temperature contacts and said holding contacts; a source of power, said main contacts being in series with said source of power and the winding of said relief valve.

4. In a safety system for storing high pressure petroleum gas, a storage vessel, a solenoid relief valve on said vessel, a plurality of temperature responsive devices around said vessel and subject to conflagration temperature, a solenoid switch having main contacts and holding contacts, said temperature responsive devices having low temperature contacts and high temperature contacts, said solenoid switch being under control by said high temperature contacts and under series control by said low temperature contacts and said holding contacts; a source of power, said main contacts being in series with said source of power and the winding of said relief valve, and a manual swich bridged across said low temperature contacts.

5. In a safety system for storing high pressure fluid, a storage vessel, a solenoid relief valve on said vessel, a thermocouple having its hot junction adjacent said vessel and subject to conflagrations, a low temperature galvanometer and a high temperature galvanometer operated by said thermocouple, a solenoid switch having main contacts and holding contacts, a locking relay, a source of low voltage, a source of high voltage, a circuit including serially said low voltage source, the winding of said locking relay, said holding contacts and said low temperature contacts; said high temperature contacts being connected across that part of said circuit including said low temperature contacts and holding contacts; a second circuit including serially the winding of said solenoid switch, said locking relay contacts and said high voltage source; and an additional circuit including serially the winding of said solenoid relief valve, said main contacts and said high voltage source.

6. In a safety system for storing high pressure petroleum gas, a storage vessel, a solenoid relief valve on said vessel, a plurality of thermocouples having their hot junctions around said vessel and subject to conflagration, a low temperature galvanometer and a high temperature galvanometer operated by said thermocouples, a solenoid switch having main contacts and holding contacts, a locking relay, a source of low voltage, a source of high voltage, a circuit including serially said low voltage source, with winding of said locking relay, said holding contacts and said low temperature contacts; said high temperature contacts being connected across that part of said circuit including said low temperature contacts and holding contacts; a manually operated switch bridged across said low temperature contacts; a second circuit including serially the winding of said solenoid switch, said locking relay contacts and said high voltage source; and an additional circuit including serially the winding of said solenoid relief valve, said main contacts and said high voltage source.

7. In a safety system for storing high pressure fluid, a storage vessel, a solenoid relief valve on said vessel, a thermostat adjacent said vessel at a point subject to conflagration, said thermostat having low temperature contacts and high temperature contacts, a source of electric power, a transformer fed by said source, a solenoid switch having main contacts and holding contacts, a circuit including serially the winding of said relief valve, said source of power and said main contacts; a second circuit including serially the winding of said solenoid switch, the secondary of said transformer and said high temperature contacts; a third circuit bridged across said high temperature contacts and including serially said low temperature contacts and said holding contacts.

8. In a safety system for storing high pressure petroleum gas, a storage vessel, a solenoid relief valve on said vessel, a plurality of bimetallic thermostats around said vessel at points subject to conflagration, said thermostats having low temperature contacts and high temperature contacts, a source of electric power, a transformer fed by said source, a solenoid switch having main contacts and holding contacts, a circuit including serially the winding of said relief valve, said source of power and said main contacts; a second circuit including serially the winding of said solenoid switch, the secondary of said transformer and said high temperature contacts; a third circuit bridged across said high temperature contacts and including serially said low temperature contacts and said holding contacts; and a manually operated switch bridged across said low temperature contacts.

9. In a safety system for storing high pressure fluid, a storage vessel, a solenoid relief valve on said vessel, a thermocouple having its hot junction adjacent said vessel at a point subject to conflagration, a millivoltmeter having a coil connected to said hot junction and having low temperature contacts and high temperature contacts engageable by movement of said coil, a source of electric power, a transformer fed by said source, a solenoid switch having main contacts and holding contacts, a circuit including serially the winding of said relief valve, said source of power and said main contacts; a second circuit including serially the winding of said solenoid switch, the secondary of said transformer and said high temperature contacts; a third circuit bridged across said high temperature contacts and including serially said low temperature contacts and said holding contacts.

10. In a safety system for storing high pressure petroleum gas, a storage vessel, a solenoid relief valve on said vessel, a plurality of thermocouples having their hot junctions around said vessel at points subject to conflagration, a millivoltmeter for each thermocouple having a coil connected to said hot junction and having low temperature contacts and high temperature contacts engageable by movement of said coil, a source of electric power, a transformer fed by said source, a solenoid switch having main contacts and holding contacts, a circuit including serially the winding of said relief valve, said source of power and said main contacts; a second circuit including serially the winding of said solenoid switch, the secondary of said transformer and said high temperature contacts; a third circuit bridged across said high temperature contacts and including serially said low temperature contacts and said holding contacts; and a manually operated switch bridged across said low temperature contacts.

11. In a safety system for storing high pressure fluid, a storage vessel, a relief valve on said vessel and operable by pressure of fluid within said vessel, restoring means operating to close said valve, a temperature responsive device adjacent said vessel and subject to conflagration, opening means governed by said temperature responsive device for opening said relief valve against the force exerted by said restoring means, said opening means and said restoring means being so related that at a predetermined fluid pressure within said storage vessel said restoring means operates to close said relief valve regardless of energization of said opening means.

12. In a safety system for storing high pressure liquefiable gas, a storage vessel having walls of such extended area that portions of them may be heated by a local conflagration to such unsafe temperature as to weaken them while other portions remain at safe temperatures, said storage vessel being thereby subject to unsafe conditions under which the pressure of the stored gas may be too high for the strength of said weakened wall portions, safety means for restoring said vessel to safe condition under which the pressure of the stored gas is not too high for the strength of the wall of the vessel, said safety means comprising a pressure relief valve on said vessel, said pressure relief valve being operable in response to pressure inside said vessel, a plurality of temperature-responsive devices distributed along said walls so as to be individually subjected to said local conflagration, and means governed by the response to said local conflagration of any one or more of said temperature-responsive devices, regardless of the temperature of the other temperature-responsive devices, for opening said pressure relief valve.

13. In a safety system for storing high pressure liquefiable gas, a storage vessel having walls of such extended area that portions of them may be heated by a local conflagration to such unsafe temperature as to weaken them while other portions remain at safe temperatures, said storage vessel being thereby subject to unsafe pressure-temperature relationship under which the pressure of the stored gas is too high for the strength of said weakened wall portions, safety means for restoring to said vessel a safe pressure-temperature relationship under which the pressure of the stored gas is not too high for the strength of the wall of the vessel, said safety means comprising a relief valve on said vessel, a plurality of temperature-responsive devices distributed along said walls so as to be individually subjected to said local conflagration, means governed by the response to said local conflagration of any one or more of said temperature-responsive devices, regardless of the temperature of the other temperature-responsive devices, for opening said relief valve, and means governed by return of safe pressure-temperature relationship for reclosing said relief valve while substantial, but safe, pressure remains in the vessel.

GEORGE R. BENZ.
ELMER O. MATTOCKS.

REFERENCES CITED

The following references are of record in the file of this patent:

UNITED STATES PATENTS

| Number | Name | Date |
|---|---|---|
| 258,500 | Stover | May 23, 1882 |
| 871,813 | McNutt | Nov. 26, 1907 |
| 1,167,815 | Gold | Jan. 11, 1916 |
| 1,633,923 | Casey | June 28, 1927 |
| 1,735,415 | Spinney | Nov. 12, 1929 |
| 1,902,027 | Henkel | Mar. 21, 1933 |
| 2,099,643 | Werring | Nov. 16, 1937 |
| 2,271,786 | Watkins | Feb. 3, 1942 |
| 2,356,990 | Getz | Aug. 22, 1944 |